United States Patent
Bamler et al.

Patent Number: 5,923,279
Date of Patent: Jul. 13, 1999

[54] METHOD OF CORRECTING AN OBJECT-DEPENDENT SPECTRAL SHIFT IN RADAR INTERFEROGRAMS

[75] Inventors: Richard Bamler, Gilching, Germany; Gordon Davidson, Vancouver, Canada

[73] Assignee: Deutsches Zentrum fur Luft-und Raumfahrt E.V., Bonn, Germany

[21] Appl. No.: 09/024,663

[22] Filed: Feb. 17, 1998

[30] Foreign Application Priority Data

Feb. 17, 1997 [DE] Germany ................. 197 06 158

[51] Int. Cl.$^6$ ................................. G01S 13/90
[52] U.S. Cl. ................. 342/25; 342/194; 342/196
[58] Field of Search ................. 342/25, 162, 194, 342/195, 196, 203

[56] References Cited

U.S. PATENT DOCUMENTS

| | | | |
|---|---|---|---|
| 5,237,329 | 8/1993 | Bamler et al. | 342/25 |
| 5,260,708 | 11/1993 | Auterman | 342/25 |
| 5,307,070 | 4/1994 | Runge et al. | 342/25 |
| 5,608,405 | 3/1997 | Pritt | 342/25 |
| 5,659,318 | 8/1997 | Madsen et al. | 342/25 |
| 5,726,656 | 3/1998 | Frankot | 342/25 |
| 5,774,089 | 6/1998 | Bamler et al. | 342/25 |

OTHER PUBLICATIONS

Gatelli, Fabio et al., "The wavenumber shift in SAR interferometry.", IEEE, Transactions on Geoscience and Remote Sensing, vol. 32, No. 4, pp. 855–865 (Jul. 1994).

Zebker, Howard A. et al., "Decorrelation in interferometric radar echoes.", IEEE Transactions on Geoscience and Remote Sensing, vol. 30, No. 5, pp. 950–959 (Sep. 1992).

Primary Examiner—John B. Sotomayor
Attorney, Agent, or Firm—Browdy and Neimark

[57] ABSTRACT

A method of correcting an object-dependent spectral shift in radar interferograms has two main procedures. In the first, the phase of the interferogram is reconstructed through phase unwrapping and subsequently smoothed for reducing noise. In the second, the two complex-value radar images intended for forming the interferogram are suitably multiplied by a factor derived from the smoothed phase, and are subsequently low-pass-filtered. The spectral shift dependent on the local inclination of the terrain is thus adaptively corrected and the decorrelation caused by the image geometry is extensively eliminated. Particularly in the region of critical, mountainous terrain, the phase noise drops to a very low level.

6 Claims, 3 Drawing Sheets

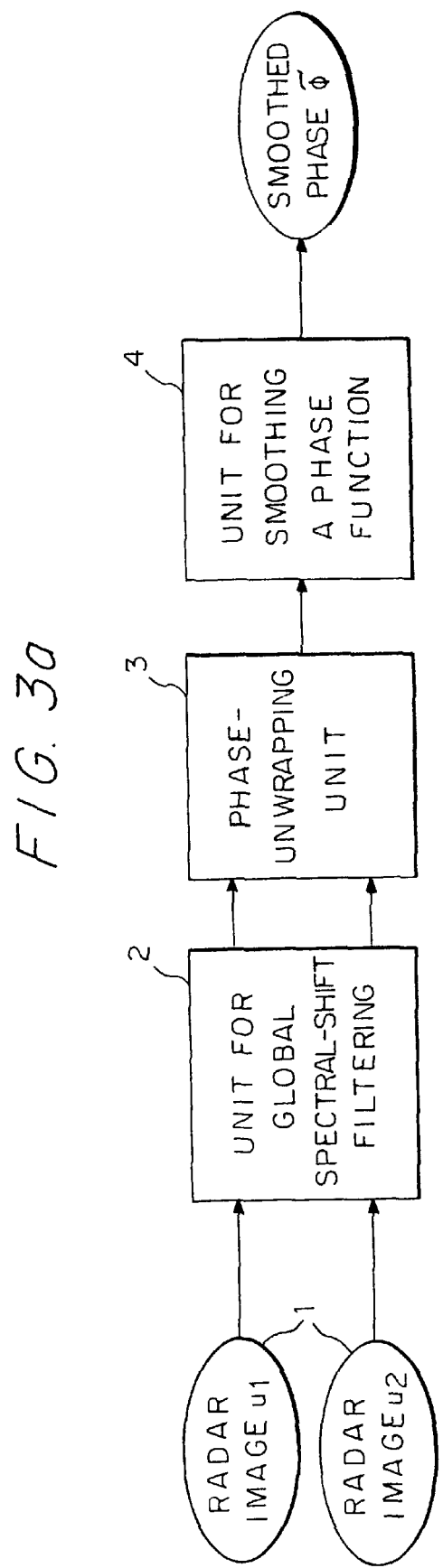

METHOD OF CORRECTING AN OBJECT-DEPENDENT SPECTRAL SHIFT IN RADAR INTERFEROGRAMS

FIELD OF THE INVENTION

The invention relates to a method of correcting an object-dependent spectral shift in radar interferograms.

REVIEW OF THE RELATED TECHNOLOGY

In radar interferometry, local differences in range $\Delta R(r,x)$ between two complex-value radar images $u_1(r,x)$ and $u_2(r,x)$ are determined, the differences being recorded from slightly different viewing angles. The coordinates r and x respectively indicate the position of a sampling point in the distance direction (typically referred to as range) and parallel to the direction of flight (usually called azimuth). The two radar images $u_1$ and $u_2$ are either recorded with two antennas in a single pass (so-called single-pass interferometry) or with one antenna in two passes (so-called repeat-pass interferometry). The differences in range are used to derive digital height models of the earth's surface, for example, or to make cm-range measurements of shifts in the earth's crust or in glaciers.

FIG. 1 shows a simplified version of a typical recording geometry: A radar sensor that is intended to fly perpendicularly in the recording plane creates an image of a strip of the earth's surface—hereinafter called "the object"—from two different viewing angles $\theta_1$ and $\theta_2$. The distance between the two sensor positions, measured perpendicularly to the center viewing direction, is called the base line B. The difference in range $\Delta R$ depends on the height of the terrain. To measure $\Delta R(r,x)$, the radar images are suitably multiplied by one another; the result is called an interferogram:

$$z(r,x) = u_1(r,x) \cdot u^*_2(r,x) \quad (1)$$

where the asterisk means "conjugated complex."

The phase of the interferogram depends on the range difference to be determined (up to whole-number multiples of $2\pi$):

$$\phi(r, x) = -\frac{4\pi}{\lambda} \Delta R(r, x) \quad (2)$$

Equation (2) and the following equations are applicable as examples for repeat-pass interferometry; the phase is only half as large in single-pass interferometry.

The precision with which the terrain height can be derived from the interferogram is dependent to a great extent on the noise of the interferogram phase. Phase noise is caused both by thermal receiver noise and so-called decorrelation effects. One reason that a decorrelation occurs between the two radar images $u_1(r,x)$ and $u_2(r,x)$ is that a resolution cell on the earth's surface is viewed from slightly different angles of incidence in the two recordings.

For better understanding of this effect, it is helpful to develop the radar backscatter distribution on the earth's surface in Fourier components perpendicular to the direction of flight. A single, periodic structure of the spatial frequency $f_E$ appears as two different frequencies (in the range direction) in the two radar recordings because of the different viewing angles $\theta_1$ and $\theta_2$:

$$f_1 = \frac{f_E}{\sin(\theta_1 - \alpha)} \text{ and } f_2 = \frac{f_E}{\sin(\theta_2 - \alpha)} \quad (3)$$

where $\alpha$ is the local inclination of the terrain. After the two radar images have been recorded with the same radar frequency and bandwidth, they include partially different frequency components of the object.

For small relative bandwidths, this effect appears as a spectral shift by the frequency $$\Delta f = f_1 - f_2 = \frac{2B}{R\lambda\tan(\theta - \alpha)} \quad (4)$$

where $\Theta$ and R indicate the center viewing angle and the center distance of the interferometer from the object respectively. With an increasing spectral shift, the correlation of the radar images drops corresponding to the ratio of the frequency shift $\Delta f$ to the bandwidth of the radar system.

If the frequency shift $\Delta f$ is known, the correlation can be completely reproduced in that a special range-frequency filtering (referred to hereinafter as spectral-shift filtering) of the two radar images causes the spectral components that are not included in the respectively other image to be omitted, as shown schematically in FIG. 2. The spectra are functions of range frequency, taken at a constant value of azimuth. The frequency shift $\Delta f$ is identical to the local interferogram frequency, that is, the derivation of the phase that has been normalized to $2\pi$ according to the range.

A technical problem that occurs in practice is efficiently performing this filtering to be locally adaptive, i.e., to be adapted to the frequency shift dependent on the locally-varying range inclination of the terrain.

The effect of the spectral shift is mentioned in the following publications, and is referred to therein as "baseline decorrelation, geometric decorrelation or wavenumber shift":

Zebker, H. A., Villasenor, J.: "Decorrelation in interferometric radar echoes," IEEE Transactions on Geoscience and Remote Sensing, vol. 30(5), pp. 950–959, 1992.

Gatelli, F., Monti Guarnieri, A., Parizzi; F., Pasquali, P., Prati, C., Rocca, F.: "The wavenumber shift in SAR interferometry," IEEE Transactions on Geoscience and Remote Sensing, vol. 32(4), pp. 855–865, 1994.

Gatelli et al propose to cancel the correlation loss through a filtration. However, only a global filtering that can be implemented with the aid of Fast Fourier Transformation (FFT) is performed in most embodiments of interferogram-processing devices. In such cases the inclination of the terrain is disregarded, and $\Delta f$ is assumed to be constant. Thus, insufficient filtering is performed for inclinations of the terrain toward the radar, and excessive filtering is performed for inclinations away from the radar.

The few proposals for an adaptive filtering employ a local estimation of the frequency shift $\Delta f$ and correspondingly-adapted band-pass filters.

A disadvantage of the proposed methods is that a global filtering with a constant frequency shift $\Delta f$ generally does not fully utilize the information in the interferogram. Moreover, adaptive filters having a local estimation of the frequency shift $\Delta f$ are highly susceptible to estimation errors, and are computing-time-intensive due to the implementation of the band-pass filter as a convolution in the local area.

SUMMARY OF THE INVENTION

It is therefore the object of the invention to provide a method of correcting an object-dependent spectral shift in radar interferograms, in which the information contained in the interferograms is utilized completely and, despite the adaptivity of the method, the advantages of a filtering through Fast-Fourier Transformation (FFT) are utilized. The present invention accomplishes this in a method of correcting an object-dependent spectral shift in radar interferograms.

The method of the invention makes use of the fact that, in each processing of interferograms, the $2\pi$ ambiguity of the phase must be eliminated. This step, which is necessary anyway, is called phase unwrapping. A phase curve obtained in this manner can be smoothed through averaging of adjacent sampling values, for example. The derivation of the phase curve in the range is a robust estimated value of the frequency or frequency shift $\Delta f$, which is not only based on a small environment of a sampling value, but includes information from the entire interferogram that has been obtained through phase unwrapping.

The smoothed phase is used in the filtering itself for suitably shifting the spectra of the radar images locally so that the filtering of an image can be performed as a single low-pass filtering in the range direction with the aid of FFT. That is, each range line at the image, at a constant value of azimuth, is low-pass filtered by FFT.

Thus, the invention creates a robust method in which the advantages of a filtering using FFT are utilized, despite the adaptivity of the method. This speed advantage is supported by the fact that hardware FFT chips are universal components of the digital signal processing, and are furthermore continuously improved.

BRIEF DESCRIPTION OF THE DRAWING

The above and other objects and the nature and advantages of the present invention will become more apparent from the following detailed description taken in conjunction with drawings, wherein:

FIG. 3-1 is a schematic or flowchart view of a first sequence of processing steps for a preferred embodiment of the method of the invention for determining a smoothed interferogram phase; and FIG. 3-2 is a continuation of the flow chart of FIG. 3-1 showing a second sequence of processing steps of the method of the invention.

DETAILED DESCRIPTION OF THE PREFERRED EMBODIMENT

Figure 1:
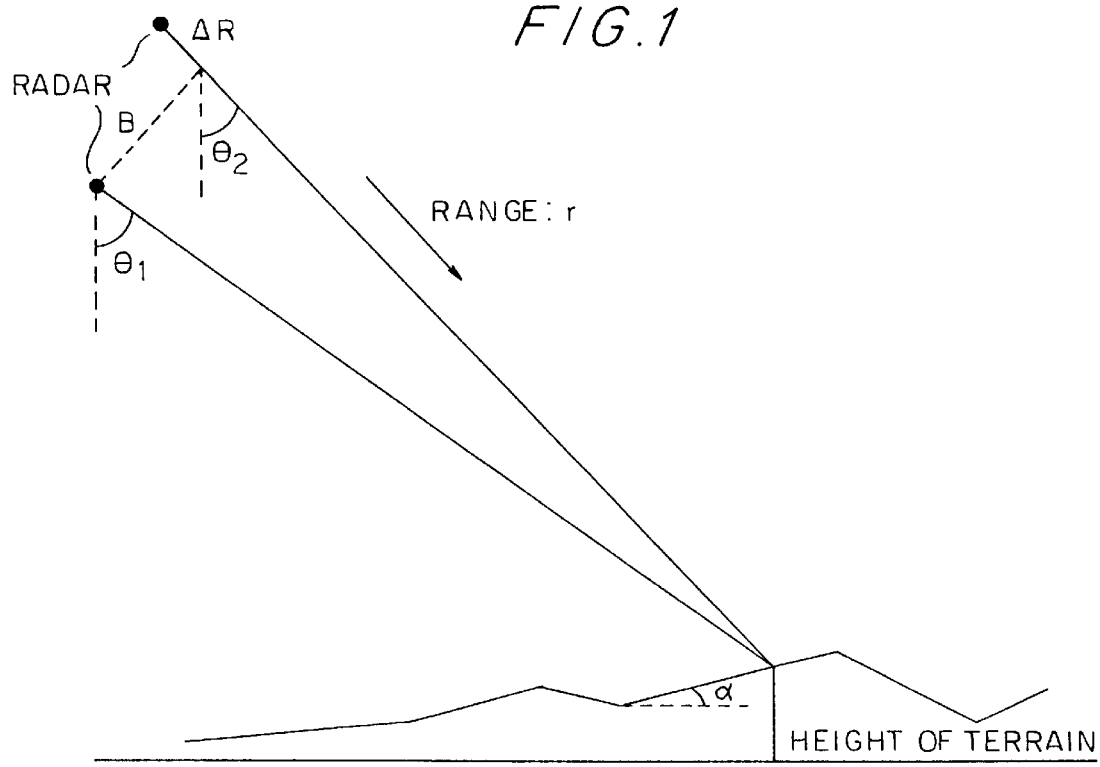
FIG. 1 is a schematic view of the invention illustrating a typical recording geometry for radar interferometry.
Figure 2:
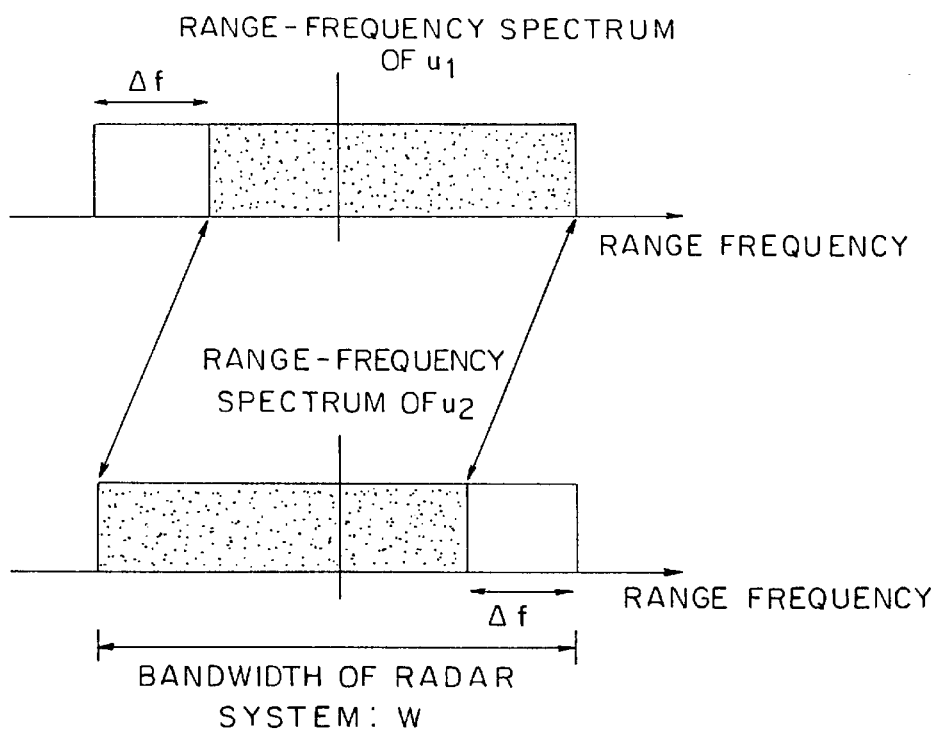
FIG. 2 is a schematic/graphical view showing how correlated (shaded) spectral components in range spectra of two radar images are shifted with respect to one another by a frequency shift.
Figure 3B:
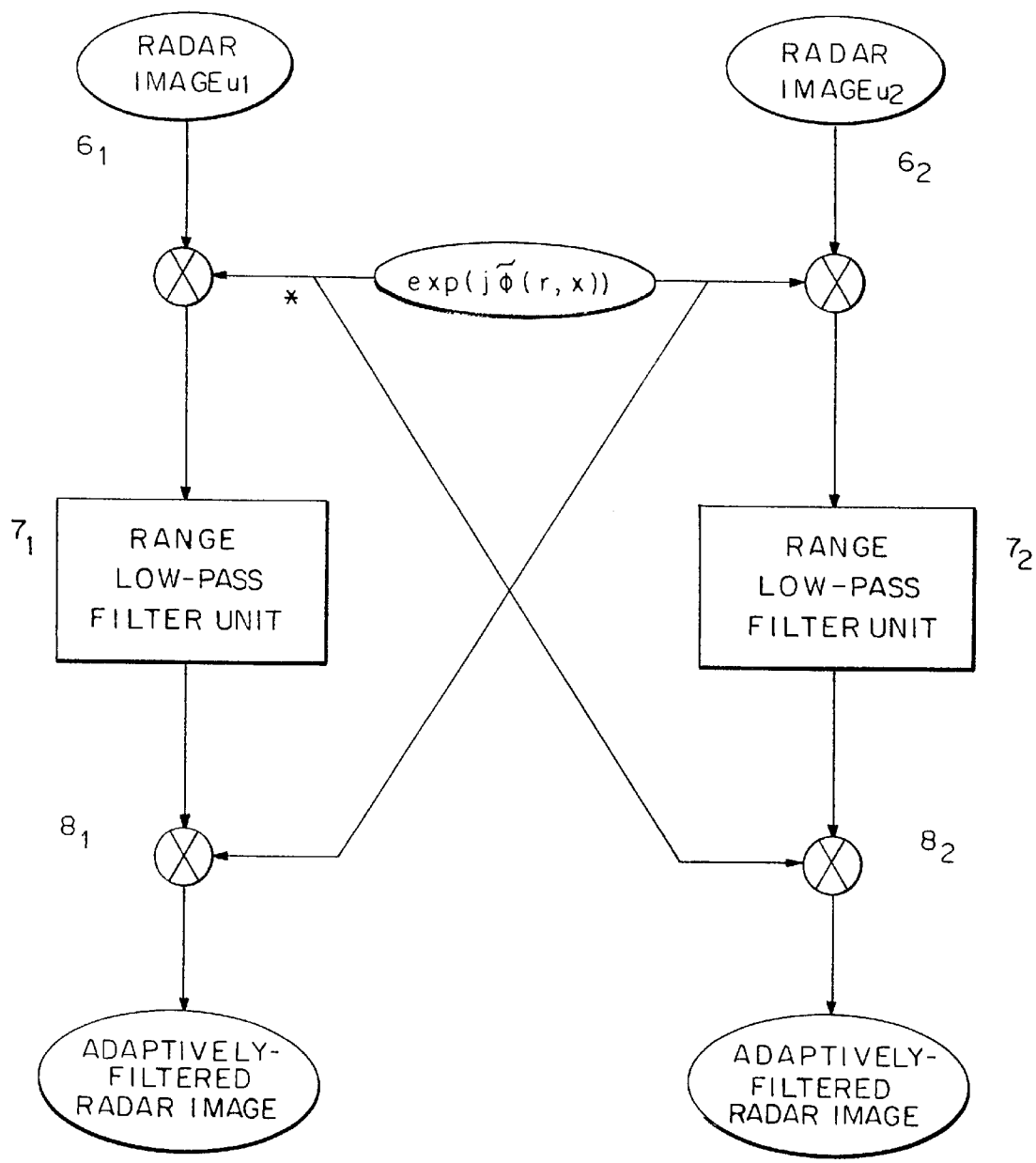

A preferred execution of the method of the invention is explained in conjunction with the flow charts in FIGS. 3-1 and 3-2.

FIG. 3-1 shows a first sequence of steps S1-2 through S1-4 of the method of the invention. In the first sequence, two complex-value radar images $u_1(r,x)$ and $u_2(r,x)$ are globally filtered with a constant value $\Delta f$ in a spectral-shift filtering unit (2). This leads to a global increase in the correlation. A smoothed, and therefore noise-reduced, interferogram phase $\phi(r,x)$ is obtained in a phase-unwrapping unit (3) disposed downstream of the unit (2), and, if no smoothed phase has been obtained yet with the phase-unwrapping method, in a downstream smoothing unit (4) (Steps S1-3 and S1-4).

A second step sequence S2-6 and S2-7 shown in the flow chart in FIG. 3-2 also starts with the two unfiltered radar images $u_1(r,x)$ and $u_2(r,x)$. The following two products are then formed in multiplier units $6_1$ and $6_2$, with $$u_1(r,x) \cdot \exp(-j\phi(r,x)) \tag{5}$$

being formed in the multiplier unit $6_1$ and $$u_2(r,x) \cdot \exp(j\phi(r,x)) \tag{6}$$

being formed in the multiplier unit $6_2$.

The images that are phase-corrected in this manner are respectively low-pass-filtered to the range bandwidth W of the radar system in a range low-pass filter unit $7_1$ or $7_2$. Each low-pass filter unit $7_1$ and $7_2$ is usefully embodied through fast convolution, i.e., a sequence of range FFT, multiplication and range-inverse FFT.

Finally, depending on the further processing required for the images, the phase correction from Equations (5) and (6) can be partially or completely canceled through corresponding multiplication of $\exp(j\phi(r,x))$ or $\exp(-j\phi(r,x))$ in the multiplier units $8_1$ and $8_2$ downstream of the filter units $7_1$ and $7_2$, as shown in the lower portion of the flow chart in FIG. 3-2.

All of the described processing steps are elementary operations, and can be effected with both hardware and software.

The function of the described filtering is to be understood as follows: The smoothed phase is considered to be approximated in linear fashion in parts with the increase $$\frac{\partial \tilde{\phi}(r,x)}{\partial r} \cong 2\pi \Delta f(r,x) \tag{7}$$

The multiplication of $u_1(r,x)$ and $u_2(r,x)$ with this linear phase according to Equations (5) and (6) shifts their signal spectra by the frequency shift $\Delta f$, to lower or higher frequencies, through the pass-through range W of the downstream low-pass filter. This filter therefore omits the non-correlated spectral components of the images (FIG. 2). Because the phase increase of the smoothed phase changes locally corresponding to $\Delta f(r,x)$, the described filtering is likewise adapted to the local variation in the spectral shift.

In a modified embodiment of the method, the phase multiplication with $\pm\phi(r,x)$ is split into two steps of $\pm \phi(r,x)/2$. First, the multiplication is only performed with $\exp(\pm j\phi(r,x)/2)$, so the correlated spectral components of the two images respectively arrive at the same frequencies. Instead of a low-pass filter, this intermediate step involves a spectral weighting, as is frequently required in so-called side-lobe reduction. The processing is completed by a further spectral shift through multiplication of the images that have been transformed again into the spatial range with $\exp(\pm j\phi(r,x)/2)$ and a subsequent low-pass filtering, as already described above.

Because of their processing history, complex-value radar images frequently do not have a spectrum that is limited in rectangular shape, as shown in FIG. 2, but are already provided with a spectral weighting. In this case, this (known) weighting must be corrected through filtering in a pre-processing step before the method of the invention is employed.

The foregoing description of the specific embodiments will so fully reveal the general nature of the invention that others can, by applying current knowledge, readily modify and/or adapt for various applications such specific embodiments without undue experimentation and without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. The means and materials for carrying out various disclosed functions may take a variety of alternative forms without departing from the invention.

Thus the expressions "means to . . . " and "means for . . . " as may be found in the specification above and/or in the claims below, followed by a functional statement, are intended to define and cover whatever structural, physical, chemical or electrical element or structure may now or in the future exist carries out the recited function, whether or not precisely equivalent to the embodiment or embodiments disclosed in the specification above; and it is intended that such expressions be given their broadest interpretation.

What is claimed is:

1. A method of correcting an object-dependent spectral shift in radar interferograms, comprising:
   (S1-1) providing two complex-value radar images ($u_1$, $u_2$) for interferometric processing;
   a first sequence of processing steps (S1-2 through S1-4) further comprising:
   (S1-2) globally filtering the two complex-value radar images ($u_1$, $u_2$) in a spectral-shift filter unit (2);
   (S1-3) subsequently determining by means of a two-dimensional phase-unwrapping unit (3) a non-ambiguous interferometric phase; and
   (S1-4) processing the non-ambiguous interferometric phase into a smoothed interferogram phase in a downstream smoothing unit (4);
   a second sequence of processing steps (S2-6 and S2-7) further comprising:
   multiplying the two complex-value radar images ($u_1$, $u_2$) by respectively opposite phase factors $\exp(-j\phi(r,x))$ and $\exp(j\phi(r,x))$ in a multiplier unit ($6_1$, $6_2$) to obtain products; and
   subsequently low-pass-filtering, in the range direction, the products toward the bandwidth of the radar system in a downstream low-pass filter unit ($7_1$ or $7_2$).

2. The method according to claim 1 including an additional step performed after the low-pass filtering in the filter unit ($7_1$, $7_2$), the additional step comprising
   canceling the multiplication with the phase factors $\exp(-j\phi(r,x))$ and $\exp(j\phi(r,x))$ in at least one of the two complex-value radar images ($u_1$, $u_2$).

3. The method according to claim 2 wherein the step of canceling the multiplication includes completely canceling the multiplication.

4. The method according to claim 1, wherein the steps of multiplying in the multiplier unit ($6_1$, $6_2$) and filtering the low-pass filter unit ($7_1$, $7_2$) are doubled, whereby the steps of multiplying and filtering comprise
   a first step wherein the two complex-value radar images ($u_1$, $u_2$) are multiplied by respectively opposite phase factors $\exp(-j\phi(r,x)/2)$ and $\exp(j\phi(r,x)/2)$ in the multiplier units ($6_1$, $6_2$), and the products are subsequently filtered with a predetermined spectral transfer function in a filter unit, and
   a second step wherein the filtered radar images are again multiplied by the phase factors $\exp(-j\phi(r,x)/2)$ and $\exp(j\phi(r,x)/2)$, and the products are subsequently low-pass filtered in the range direction toward the bandwidth of the radar system in low-pass filter units ($7_1$, $7_2$).

5. The method according to claim 2, wherein the steps of multiplying in the multiplier unit ($6_1$, $6_2$) and filtering the low-pass filter unit ($7_1$, $7_2$) are doubled, whereby the steps of multiplying and filtering comprise
   a first step wherein the two complex-value radar images ($u_1$, $u_2$) are multiplied by respectively opposite phase factors $\exp(-j\phi(r,x)/2)$ and $\exp(j\phi(r,x)/2)$ in the multiplier units ($6_1$, $6_2$), and the products are subsequently filtered with a predetermined spectral transfer function in a filter unit, and
   a second step wherein the filtered radar images are again multiplied by the phase factors $\exp(-j\phi(r,x)/2)$ and $\exp(j\phi(r,x)/2)$, and the products are subsequently low-pass filtered in the range direction toward the bandwidth of the radar system in low-pass filter units ($7_1$, $7_2$).

6. In a method of determining range (R) to an object from two radar imaging signals ($u_1$, $u_2$) impinging on the object at two viewing angles ($\Theta1$, $\Theta2$) and being functions of a range r and an azimuth x;
   wherein due to physical effects, including a differing range inclination angle ($\alpha$) of the object, an object-dependent spectral range frequency shift ($\Delta f$) exists between backscattered echoes of the two radar imaging signals from the object;
   wherein the object-dependent spectral frequency shift is determinable from a phase angle ($\phi$) of a complex valued interferogram $z(r,x)$ being equal to a product of one the radar imaging signals by a complex conjugate of another of the radar imaging signals according to $$z(r,x) = u_1(r,x) \cdot u^*_2(r,x); \tag{1}$$

the interferogram having an interferogram phase function $\phi(r,x)$;
wherein the improvement comprises:
   smoothing the interferogram phase function $\phi(r,x)$;
   filtering the interferogram by the multiplying a each of the two radar imaging signals ($u_1$, $u_2$) by the interferogram phase $\phi(r,x)$ according to $$u_1(r,x) \cdot \exp(-j\phi(r,x)) \tag{5}$$

and $$u_2(r,x) \cdot \exp(j\phi(r,x)) \tag{6}$$

where exp represents exponentiation to the base e and $j=\sqrt{-1}$, to produce a phase-corrected image signal; and
   low-pass-filtering the phase-corrected image signal.

* * * * *